United States Patent [19]

Hung

[11] Patent Number: 5,033,094
[45] Date of Patent: Jul. 16, 1991

[54] ADJUSTABLE HEADSET

[76] Inventor: Huang-Chiang Hung, No. 379-14, Pen Kuan Rd., Ta Hwa Village, Niao Sung Hsiang, Kaohsiung Hsien, Taiwan

[21] Appl. No.: 542,939

[22] Filed: Jun. 25, 1990

[51] Int. Cl.⁵ .............................................. H04R 25/00
[52] U.S. Cl. ...................................... 381/183; 381/187
[58] Field of Search ....................... 381/183, 187, 169; 379/430, 25

[56] References Cited

U.S. PATENT DOCUMENTS

| | | | |
|---|---|---|---|
| 4,455,457 | 6/1984 | Akira | 381/187 |
| 4,542,802 | 9/1985 | Houng | 381/183 |
| 4,609,786 | 9/1986 | Omoto et al. | 381/183 |
| 4,893,344 | 1/1990 | Trägardh et al. | 379/430 |

FOREIGN PATENT DOCUMENTS 2643157  4/1978  Fed. Rep. of Germany ...... 381/183

*Primary Examiner*—Jin F. Ng
*Assistant Examiner*—Jason Chan
*Attorney, Agent, or Firm*—Rogers, Howell & Haferkamp

[57] ABSTRACT

An adjustable headset includes a headband and a pair of earpieces attached to the ends of the headband. A number of recesses are formed in a housing. The earpieces are attached to one end of the housing. A retaining device is coupled to the headband. A pair of pawls are formed on the retaining device and are engageable with either recess of the housing when the retaining device and the headband are inserted into the housing. The headband is adjustable relative to the earpieces by an engagement between the pawls and the recesses.

3 Claims, 3 Drawing Sheets

ADJUSTABLE HEADSET

BACKGROUND OF THE INVENTION

The present invention relates to a headset, and more particularly to an adjustable headset.

An adjustable headset is disclosed in U.S. Pat. No. 3,447,160 to Teder. The headband thereof is slidably and frictionally engaged with the channel so that the headband is adjustable. After a long term of using, the engagement therebetween will become loose such that the headband can not be stably retained in position. Another type of adjustable headset is disclosed in U.S. Pat. No. 4,189,788 to Schenke et al. The wedge thereof resiliently urges a fork against the support member thereby providing a slidable, frictional engagement. The patent also uses a frictional engagement which also will become loose.

The present invention has arisen to mitigate and/or obviate the afore-described disadvantages of the conventional headset.

SUMMARY OF THE INVENTION

The primary objective of the present invention is to provide an adjustable headset which is readily adjustable and the engagement between the headband and the earpiece is stable.

In accordance with one aspect of the invention, there is provided an adjustable headset which includes a headband and a pair of earpieces attached to the ends thereof. Two notches are formed in the headband. A coupling between each earpiece and a respective end of the headband includes a housing having a lower end for engaging with the earpiece. The housing has two end walls facing each other. A number of recesses are formed in an inner surface of each end wall. A pair of flanges are formed on a lower end of the retaining device and extend beyond the retaining device. The flanges are engaged within the notches of the headband. A pair of pawls are formed on the lower end of the retaining device. The pawls are engageable with either recess of the housing. The relative position between the earpieces and the headband is readily adjustable by an engagement between the pawls and the recesses.

Further objectives and advantages of the present invention will become apparent from a careful reading of the detailed description provided hereinbelow, with appropriate reference to the accompany drawings.

DETAILED DESCRIPTION OF THE INVENTION

Figure 1:
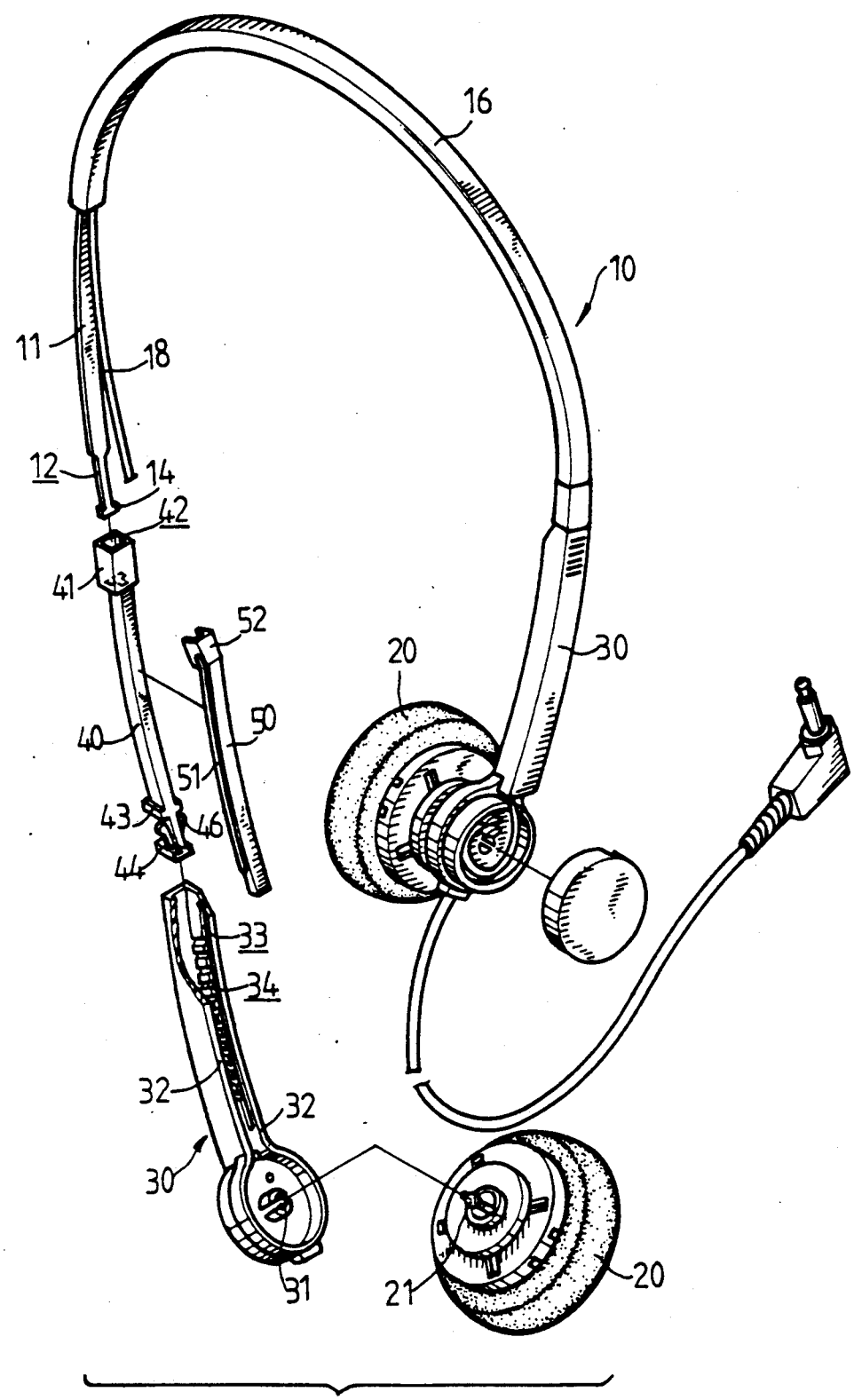
FIG. 1 is an exploded view of a headset in accordance with the present invention.
Figure 2:
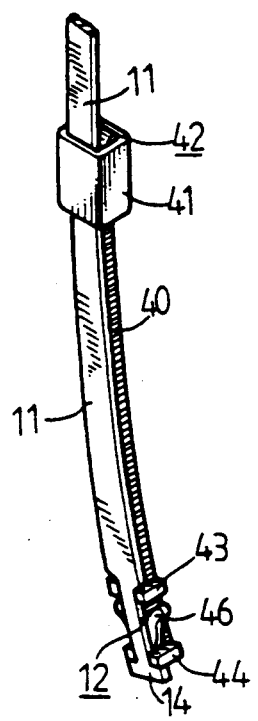
FIG. 2 is a partial perspective view of the headband of the headset.

Referring to the drawings and initially to FIGS. 1 and 2, the headset in accordance with the present invention comprises generally a U-shaped headband 10 and a pair of earpieces 20 attached to the downwardly depending ends thereof. Each of the right and left earpiece is adapted to be disposed over the ears of a user.

The headband 10 includes a resilient band 11, each end of which has two opposite notches 12 so that a stop 14 is laterally formed on the free end of the resilient band 11. A sleeve 16 is provided around the center portion of the resilient band 11. An electric wire 18 extends, from one earpiece 20 to the other, through the sleeve 16 so as to electrically connect the amplifiers or the like of both earpieces 20. A housing 30 has a female element 31 formed on a lower end thereof for making an engagement with a male element 21 of the earpiece 20 so as to hold the earpiece 20 in place. The cross section of the housing 30 is substantially U-shaped having two longitudinal end walls 32 facing each other. A longitudinal groove 33 and a plurality of lateral recesses 34 are formed in an inner surface of each end wall 32.

A retaining device 40 which is insertable into the housing 30 has a head 41 formed on one end thereof. A hole 42 is formed in the head 41 and is wide enough so that the band 11 and the wire 18 can be inserted therethrough. Two pairs of flanges 43, 44 are laterally formed on a lower end of the retaining device 40 and are spaced apart by a small distance. As is best shown in FIG. 2, one end of each flange 43, 44 extends beyond the retaining device 40. The distance between the flanges 43, 44 is predetermined such that the flanges 43, 44 are engaged within the notches 12 of the resilient band 11 and so that the retaining device 40 and the band 11 longitudinally move along and move in concert in the housing 30. A pair of resilient pawls 46 which extend upward and outward are formed on the retaining device 40 between the flanges 43, 44.

Figure 3:
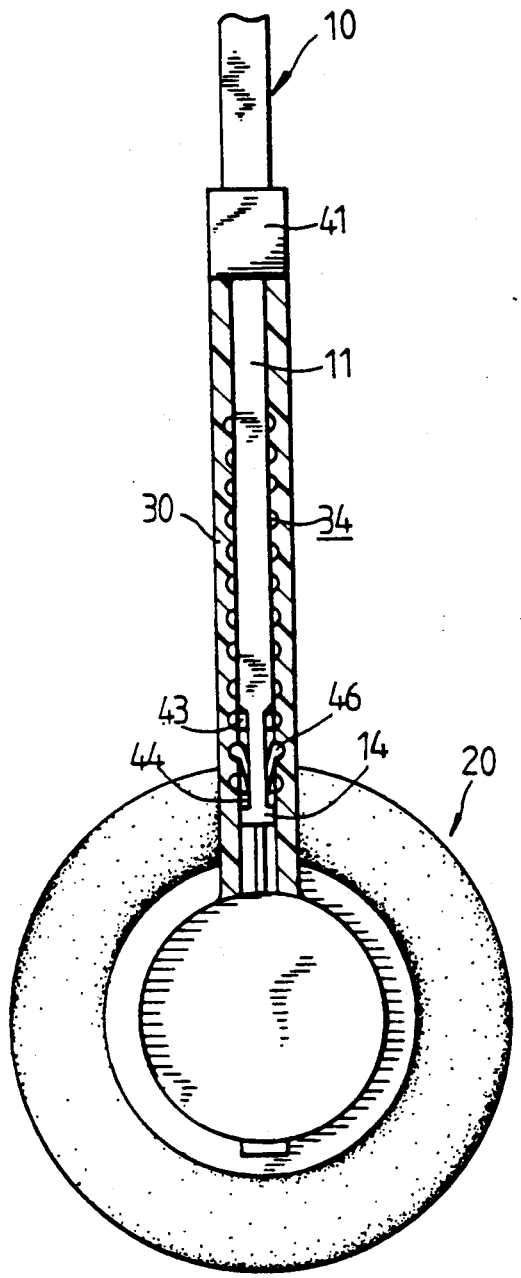
FIG. 3 is a partial cross sectional view illustrating an engagement between the headband and the earpiece.

Referring next to FIG. 3, when the lower ends of the band 11 and the retaining device 40 are inserted into the housing 30, the free end of each pawl 46 is engageable with either lateral recess 34 of the housing 30. The pawls 46 are resilient so that the retaining device 40 is slidable up and down relative to the housing 30 and is retained in position by the engagement between the pawls 46 and the recesses 34. It is to be noted that the band 11 and the retaining device 40 move or slide in concert along the housing 30 so that the relative position between the headband 10 and the earpieces 20 can be adjusted.

Figure 4:
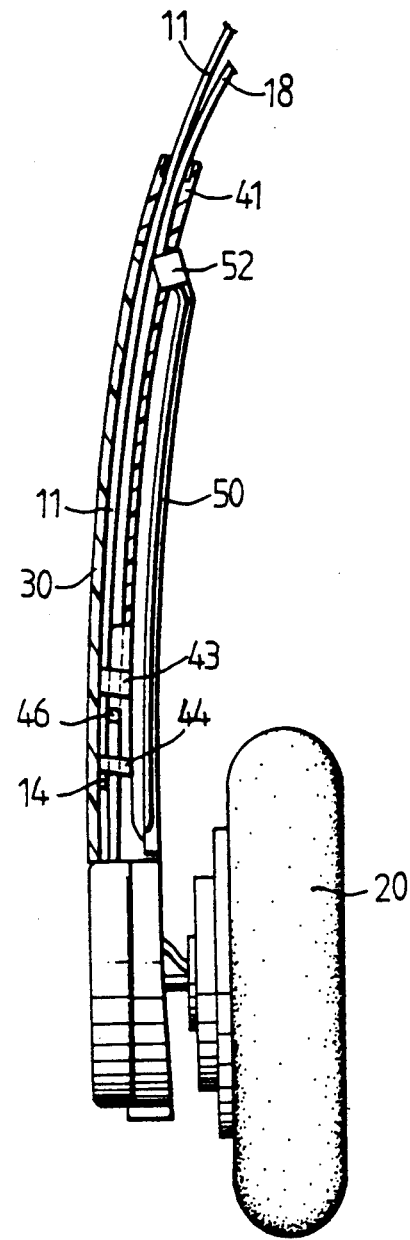
FIG. 4 is a partial cross sectional view illustrating an engagement of a cover.

Referring next FIG. 4 and again to FIG. 1, a cover 50 is substantially a strip having a pair of longitudinal ribs 51 formed on both sides thereof for engagement with the longitudinal grooves 33 of the housing 30 so that the cover 50 is guided to slide up and down along the housing 320. The cover 50 is provided to enclose the housing 30. A cap 52 formed on an upper end of the cover 50 and is slightly bent so that the cap 52 is substantially resilient and so that the cap 52 pushes and biases the retaining device 40 and the band 11 against the housing 30. The retaining device 40 and the band 11 are retained in the housing 30 and are limited to slide longitudinally along the housing 30.

Accordingly, the adjustable headset in accordance with the present invention is readily adjustable and the headband 10 can be stably retained in position by an engagement between the pawls 46 of the retaining device 40 and the recesses 34 of the housing 30.

Although this invention has been described with a certain degree of particularity, it is to be understood that the present disclosure has been made by way of example only and that numerous changes in the detailed construction and the conbination and arrangement of parts may be resorted to without departing from the spirit and scope of the invention as hereinafter claimed.

I claim:

1. An adjustable headset comprising generally a headband and a pair of earpieces attached to both downwardly depending ends thereof, said earpieces being adapted to be disposed over the ears of a user; a coupling between each said earpieces and a respective end of said headband comprising a housing having a lower end or engaging with said earpiece, said housing being substantially longitudinal and having two end walls facing each other, a plurality of recesses being formed in an inner surface of each said end wall of said housing; a retaining device which is slidable in said housing having two pairs of flanges laterally formed on a lower end thereof, one pair of said flanges being disposed above an other pair of said flanges, said flanges extending beyond said retaining device; a pair of resilient pawls being formed on said lower end of said retaining device between two pairs of said flanges, a pair of notches being formed in a lower end of said headband, said flanges of said retaining device being engaged within said notches of said headband so that said headband and said retaining device move in concert in said housing; said pawls of said retaining device being engageable at least one of the recesses recess of said housing; and a relative position between said earpiece and said headband being readily adjustable by an engagement between said pawls and said recesses.

2. An adjustable headset according to claim 1, wherein a head is formed on an upper end of said retaining device, a hole is formed in said head of said retaining device for slidably receiving and retaining said headband.

3. An adjustable headset according to claim wherein a longitudinal groove is formed in said inner surface of each said end wall; a cover has a longitudinal rib formed on each side thereof, an upper end of said cover is bent; said cover is guided to slide along said housing by a sliding engagement between said longitudinal grooves and said longitudinal ribs; and said retaining device and said headband are pushed and biased against said housing by said upper end of said cover.

* * * * *